United States Patent [19]

Nakamura et al.

[11] 4,323,837
[45] Apr. 6, 1982

[54] POWER SUPPLY CIRCUIT FOR AUTOMOTIVE VEHICLES

[75] Inventors: Kimio Nakamura, Kawasaki; Kimio Fujisawa, Yamato; Kokichi Ochiai, Fujisawa, all of Japan

[73] Assignee: Nissan Motor Company, Limited, Tokyo, Japan

[21] Appl. No.: 58,473

[22] Filed: Jul. 18, 1979

[30] Foreign Application Priority Data

Jul. 24, 1978 [JP] Japan .................. 53-100654[U]
Jul. 27, 1978 [JP] Japan .................. 53-90915
Aug. 8, 1978 [JP] Japan .................. 53-108002[U]

[51] Int. Cl.³ ................................. H02J 7/14
[52] U.S. Cl. ................................. 322/7; 307/10 R; 320/13; 320/61
[58] Field of Search .......... 320/5, 7, 8, 13, 15, 320/16, 6, 61; 307/10 R, 10 LS, 10 BP; 322/7, 8

[56] References Cited

U.S. PATENT DOCUMENTS

| | | | |
|---|---|---|---|
| 1,898,370 | 2/1933 | Hughes et al. | 320/6 X |
| 2,044,917 | 6/1936 | Richardson | 320/6 X |
| 3,588,591 | 6/1971 | Harris et al. | 307/10 BP X |
| 3,689,806 | 9/1972 | Saita | 307/10.17 X |
| 3,763,415 | 10/1973 | Ownby | 320/6 |
| 3,829,753 | 8/1974 | Marshall | 320/6 |
| 4,004,208 | 1/1977 | Tamminen | 320/7 X |
| 4,127,782 | 11/1978 | Omura et al. | 320/6 X |
| 4,132,942 | 1/1979 | Yamamoto | 320/13 |
| 4,207,511 | 6/1980 | Radtke | 320/6 |

Primary Examiner—Robert J. Hickey
Attorney, Agent, or Firm—Lane, Aitken, Kice & Kananen

[57] ABSTRACT

A power supply circuit arrangement for automotive vehicles comprises an engine-driven alternator, a storage battery, a battery charging circuit connected between the alternator and the battery including a diode poled in a sense to conduct current from the alternator to the battery and a plurality of connectors connected from the anode of the diode to supply current to associated load equipment. In one embodiment, a pair of series connected diodes is connected in inverse parallel relation with the charging diode for discharging the battery to supply current therefrom to the load equipments. A voltage detector is connected to the junction between the discharging diodes to generate a throttle opening signal when the voltage at the junction falls below a preset value. In another embodiment, the load equipments are divided into a first group of relatively heavy loads which can be operated on current less than the nominal value and a second group of relatively light loads which must be operated on the nominal current value, the first group being connected to the anode of the charging diode and the second group being connected to the cathode thereof.

4 Claims, 5 Drawing Figures

POWER SUPPLY CIRCUIT FOR AUTOMOTIVE VEHICLES

BACKGROUND OF THE INVENTION

The present invention relates to battery-assisted engine-driven alternator circuits for automotive vehicles.

Conventionally, vehicle-mounted electrically operated devices are connected directly to the engine-driven alternator and a storage battery so that additional current is supplementarily supplied from the latter when the alternator voltage reduces to a level below the battery voltage. However, if the engine is idled for an extended period of time with the electrical equipments operating at their full capabilities, the storage battery may be discharged excessively to a point where the battery is irrecoverable or otherwise the battery life is shortened.

SUMMARY OF THE INVENTION

The primary object of the invention is therefore to provide a power supply circuit arrangement for automotive vehicles which prevents the storage battery from being discharged excessively during engine low power periods when the power consumption by the accessory equipment tends to exceed the power supplied from the alternator so as to lengthen the usable life time of the battery.

According to a first aspect of the invention, the engine-driven alternator and the storate battery is connected by a charging circuit including a first diode poled in a sense to conduct current from the alternator to the battery and by a discharging circuit including series-connected second and third diodes poled in a sense opposite to the first diode to conduct current from the battery to a plurality of loads or electrical equipments which are connected to the alternator. A voltage detector is connected to a junction between the second and third diodes to detect when the voltage at the junction reduces to a level below a predetermined level for actuating the throttle valve of the engine to increase the amount of air taken into the engine, whereby the engine output power and therefore the alternator voltage is supplementarily increased.

According to a second aspect of the invention, an engine speed sensor is provided to develop a voltage signal representative of the engine speed, which voltage signal is applied to a comparator for making a comparison with a reference voltage to generate a comparator output when the engine speed reduces below the reference voltage. The comparator output is applied to a coincidence gate which receives another signal from one of a plurality of load sensing switches which generate such signals when associated electrical equipment is energized. Upon coincidence of the two input signals, the coincidence gate delivers an throttle opening signal to supplementarily increase the amount of air taken into the engine. A neutral switch may be provided to activate the coincidence gate when the gear shift position is neutral indicating that the engine is idled.

According to a third aspect of the invention, the alternator and the battery is connected by a charging circuit including a diode poled in a sense to conduct current from the alternator to the battery. The electrical equipment is divided into a first group of relatively heavy load type that can be operated on current less than the nominal current value of the load and a second group of relatively light-load type that must be operated on the nominal current value of the load. The first group equipments are connected to the anode terminal of the diode, while the second group equipments are connected to the cathode terminal of the diode. When the alternator voltage reduces below the battery voltage the diode is biased off, which cuts off the current supply from the alternator to the second light load equipments and the latter is supplied with the current from the battery.

BRIEF DESCRIPTION OF THE DRAWINGS

The invention will be further described by way of example with reference to the accompanying drawings, in which.

DETAILED DESCRIPTION

Figure 1:
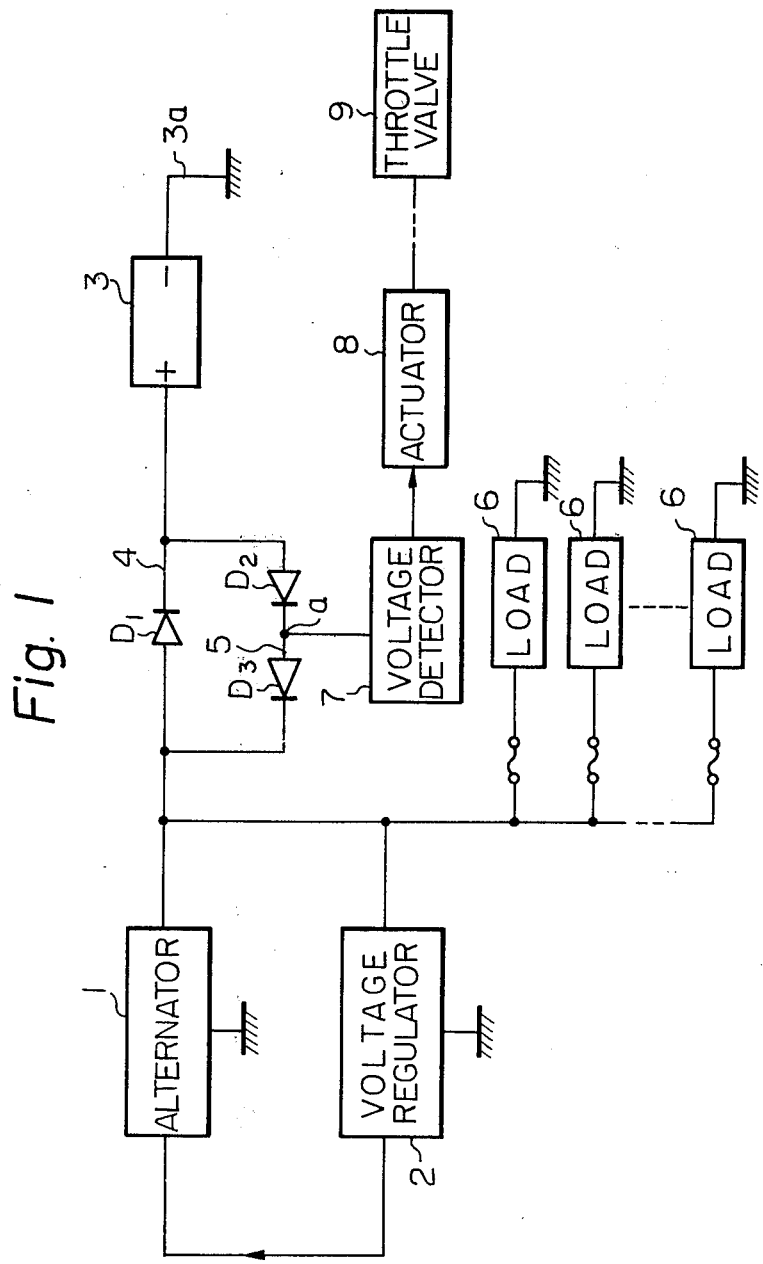
FIG. 1 is a circuit diagram of a first embodiment of the invention.

An embodiment of the vehicle power supply system of the invention is illustrated in FIG. 1 as comprising a conventional three-phase alternator 1 driven by the internal combustion engine (not shown) for delivery of a rectified DC current through a charging circuit 4 to the positive terminal of a storage battery 3 whose negative terminal is grounded at 3a. The DC voltage is controlled at a constant value by means of a conventional voltage regulator 2. The charging circuit 4 includes a diode D1 poled in a sense to allow current to pass from the alternator 1 to the battery 3. This diode is in shunt with a discharging circuit 5 including series connected diodes D2 and D3 poled in a sense opposite to the diode D1 to allow current to pass from the battery toward the alternator 1.

Various load circuits 6 are connected to the output of the alternator 1. These load circuits are powered from the alternator 1 when the voltage thereof is higher than the battery voltage and in this instance the diode D1 is forward biased for charging the battery 3. When the voltage of the alternator 1 becomes lower than the battery voltage, the diode D1 is biased off and the diodes D2 and D3 are rendered conductive to establish a discharging circuit and supplies a current to the load circuits 6. Therefore, when the engine is idled with the load circuits 6 being connected to the power source, a resultant reduction in supply voltage causes the battery 3 to supplement the additional current to the load circuits. If such battery discharge conditions exist for an extended period of time, the battery will be irrecoverably discharged.

For this purpose, a voltage detector 7 is connected to the circuit node a between the diodes D2 and D3 for detecting when the voltage at node a rises above a predetermined level due to excess discharge current to activate an actuator 8 for operating the throttle valve 9 in order that the engine output power is increased to supplement the voltage at the alternator 1 for charging the battery 3.

Figure 2:
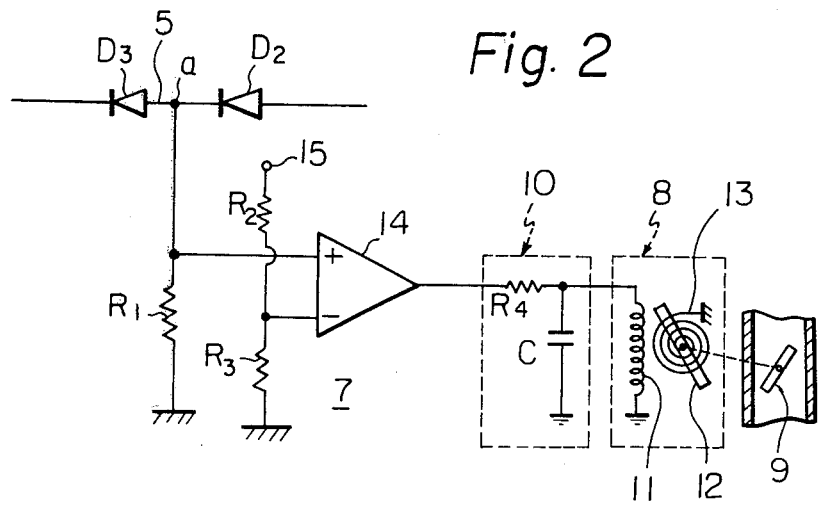
FIG. 2 is a detail of a portion of the circuit diagram of the FIG. 1 embodiment.

As shown in FIG. 2, the voltage detector 7 includes a resistor R1 connected between the circuit node a and ground to develop a voltage thereacross which increases as a function of the current through the discharging circuit 5. This voltage is applied to the noninverting input of a comparator 14 whose inverting input is connected to a reference voltage from a voltage divider formed by resistors R2 and R3 which are connected between a terminal 15 and ground, the terminal 15 being connected to the positive terminal of the battery 3.

Responsive to the voltage across resistor R1 exceeding the reference voltage the comparator 14 delivers a current to an integrator 10 including a resistor R4 and a capacitor C. The capacitor C develops a voltage which increases with time at a rate determined by the time constant value R4, C. The actuator 8 includes a solenoid 11 which is connected across the capacitor C of the integrator 10 and an armature 12 operably connected to the throttle valve 9 by means of a suitable mechanical linkage (broken-line illustration). The armature 12 is urged by means of a return spring 13 into a normal position when the solenoid 11 is ot energized. With the solenoid 11 being energized with a current supplied from the capacitor C, the armature 12 is rotated about its axis so that the throttle 9 is opened to increase the amount of air taken into the engine.

The purpose of the integrator 10 is to provide a gradual variation of output voltage in response to the detection of a high voltage at node a to prevent rapid increase in engine output power.

The actuator 8 is so designed that throttle opening is increased by an amount of 1000 rpm which increases the alternator 1 output by approximately 60%.

Figure 3:
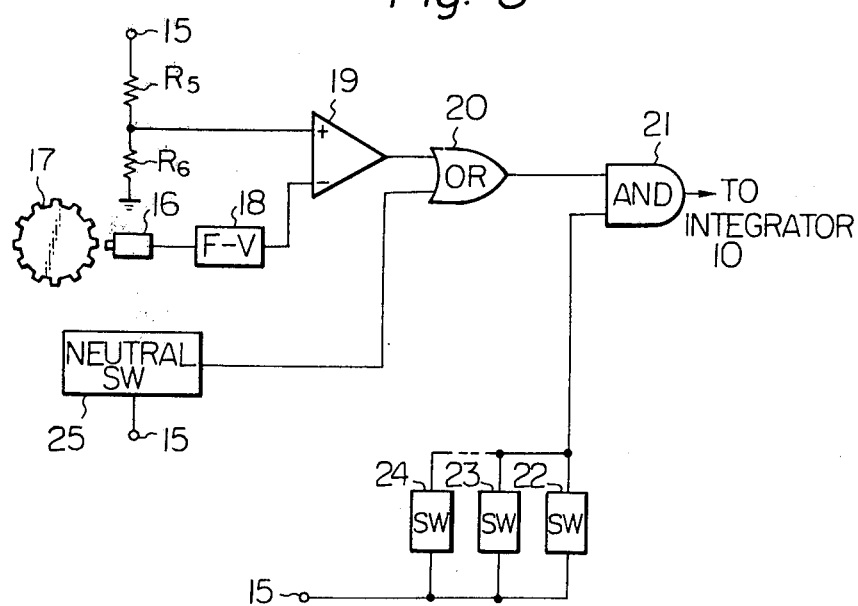
FIG. 3 is a circuit diagram of a second embodiment of the invention.

Alternatively, the circuit of FIG. 2 can also be realized by a circuit shown in FIG. 3 in which the engine speed is detected by means of an electromagnetic pickup device 16 located in proximity to the circumference of a toothed disc 17 which rotates in synchronism with the engine crankshaft. The rotation of the disc 17 results in a pulse from the output of the sensor 16 which is converted by means of a frequency-to-voltage converter 18 into an analog voltage which in turn is coupled to the inverting input of a comparator 19 for comparison with a reference voltage supplied from a voltage divider formed by resistors R5 and R6. When the engine speed is reduced as a result of the engine being idled, the comparator 19 provides a logical "1" output through an OR gate 20 to one input of an AND gate 21 whose other input is connected to a plurality of switches 22, 23 and 24. These switches are operated in response to the actuation of respectively associated heavy-duty load circuits 6 to couple a logical "1" signal to the AND gate 21. The heavy load circuits may include air conditioner, wiper washer and head lamps. Therefore, the ANG gate 21 is activated in response to the simultaneous presence of logical "1" signals from the comparator 19 and at least one of the switches 22 to 24 and such conditions exist when the engine speed is lower than the preset value and at least one of the load circuits 6 is activated. The output of the AND gate is connected to the integrator 10 and thence to the actuator 8 to increase the opening angle of the throttle valve 9.

A neutral switch 25 may be provided to detect when the transmission shift gear is in the neutral position and applies a logical "1" signal to the AND gate 21 through the OR gate 20. Since the signal from the neutral switch 25 is an indication that the engine is being idled, this signal can be considered equivalent to the signal from the comparator 19.

Figures 4, 5:
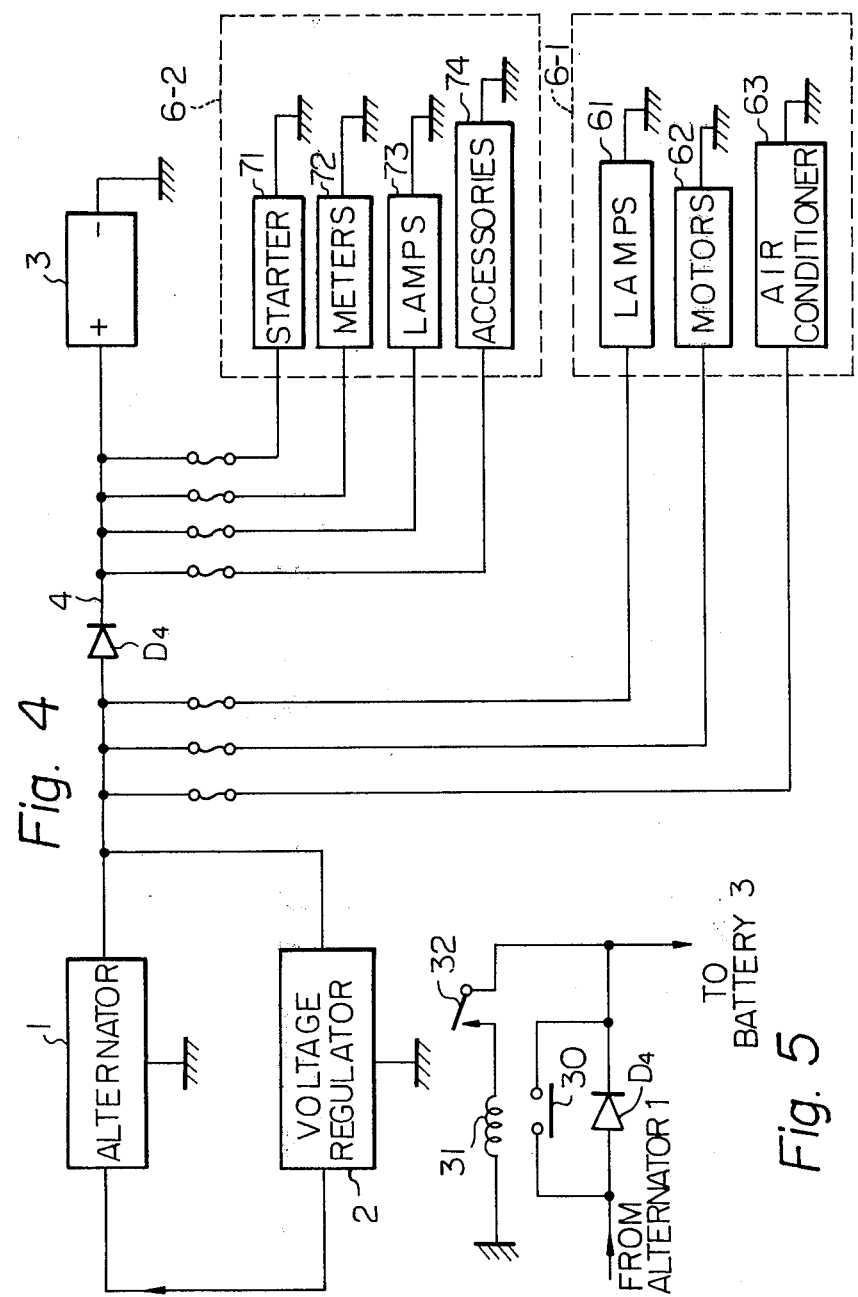
FIG. 4 is a circuit diagram of a third embodiment of the invention.
FIG. 5 is a modification of the FIG. 4 embodiment.

FIG. 4 is an illustration of another embodiment of the invention in which the loading apparatus 6 are divided into a heavy load apparatus group 6-1 and a light load apparatus group 6-2. The heavy load group 6-1 includes those which can be operated with a current slightly less than the rated current value without affecting the safety operation of the vehicle under idle condition such as fog lamps or head lamps 61, wiper motor and wiper-washer motor 62, and an air conditioner 63. The light load group 6-2 includes those which are essential to vehicle operation such as engine starting devices 71 such as ignition device and starter motor; indicating meters 72 such as speedometer, tachometer, water coolant temperature indicator, fuel meter and oil meter; various indicator lamps 73 and accessories 74 such as radio, stereo equipment and clock. The heavy load group 6-1 is connected to the anode terminal of a diode D4 connected in the battery charging circuit 4 and the light load group 6-2 is connected to the cathode terminal of the diode D4.

When the engine speed is above 2000 rpm so that the voltage at the anode terminal of diode D4 is higher than the voltage at its cathode terminal, all the loading apparatus receive power from the alternator 1. However, supply voltage reduction occurs when the engine is idled where its speed is lower than 2000 rpm. Typically, the alternator supply voltage reduces to 30% of the rated value and the diode D4 is turned off as a result of the voltage reduction, so that the alternator 1 supplies current only to the heavy duty, nonessential loading apparatus group 6-1 and the power to the light duty, essential loading apparatus group 6-2 is supplied from the battery 3. Therefore, the reduced alternator voltage can adequately operate the nonessential apparatus during idle condition without adversely affecting the safe operation of the vehicle, while assuring the power supply to the essential load equipment.

The inclusion of the head lamps in the heavy load group 6-1 has the effect of providing a reduced light intensity when the shift gear has inadvertently moved to the neutral position when the vehicle is on a downhill drive, so that such light intensity reduction serves as a warning to the vehicle driver to avoid excess acceleration of the vehicle, and when the shift gear is intentionally shifted to the neutral position when the vehicle is slowed down in congested traffic or parked and the reduced light intensity effectively eliminates the effect of dazzling the drivers of the oncoming vehicles.

When the engine speed is in the high speed range, the load current to the apparatus group 6-2 may overload the diode D4 to the point of damage. A circuit shown in FIG. 5 is provided for purposes of avoiding the damage of the diode D4 from the overcurrent. In this circuit, the diode D4 is in shunt with a relay contact 30 which is normally open. A relay winding 31 is responsive to a engine speed responsive switch 32 of the conventional design to be energized by current supplied from the battery 3. When the engine speed is above a predetermined value, the sensing switch 32 is operated to energize the relay coil 31 to close its contact 30 so that a substantial amount of the load current bypasses the diode D4. Obviously, the head lamps 61 may be included in the light load group 6-2.

What is claimed is:

1. A circuit arrangement for an engine, said circuit arrangement comprising an alternator driven by said engine, a storage battery, a charging circuit connected between said alternator and said storage battery and including a diode having an anode terminal and a cathode terminal poled in a sense to conduct current from said alternator to said battery, a first plurality of conductors connected from the anode terminal of said diode to associated load circuits of a first group, a second plurality of conductors connected from the cathode terminal of said diode to associated load circuits of a second group, means responsive to the speed of said engine execeeding a predetermined value, and means for providing a short circuit across the anode and cathode terminals of said diode in response to said engine speed responsive means.

2. A circuit arrangement as claimed in claim 1, wherein said load circuits of said first group are relatively heavy load apparatus and the load circuits of said second group are relatively light load apparatus.

3. A circuit arrangement as claimed in claim 1 or 2, wherein said first load circuit group includes a head lamp load circuit.

4. A circuit arrangement as claimed in claim 1 wherein said short circuit providing means comprises a relay having a set of normally open contacts connected across the terminals of said diode and a relay coil for causing said contacts to close in response to an actuation signal from said engine speed responsive means.

* * * * *

UNITED STATES PATENT AND TRADEMARK OFFICE
CERTIFICATE OF CORRECTION

PATENT NO. : 4,323,837
DATED : April 6, 1982
INVENTOR(S) : Kimio Nakamura et al

It is certified that error appears in the above-identified patent and that said Letters Patent is hereby corrected as shown below:

On the title page, assignee address should read

-- Yokohama City, Japan --.

Signed and Sealed this

Twenty-first Day of December 1982

[SEAL]

Attest:

GERALD J. MOSSINGHOFF

Attesting Officer

Commissioner of Patents and Trademarks